Dec. 27, 1955  K. KECK  2,728,431
TORQUE TRANSMISSION WITH CLUTCH AND BRAKE
Filed Feb. 9, 1953  4 Sheets-Sheet 1

INVENTOR
KARL KECK
BY Young, Emery & Thompson
ATTORNEYS

Dec. 27, 1955   K. KECK   2,728,431
TORQUE TRANSMISSION WITH CLUTCH AND BRAKE
Filed Feb. 9, 1953   4 Sheets-Sheet 2

INVENTOR
KARL KECK
BY Young, Emery + Thompson
ATTORNEYS

Dec. 27, 1955  K. KECK  2,728,431
TORQUE TRANSMISSION WITH CLUTCH AND BRAKE
Filed Feb. 9, 1953  4 Sheets-Sheet 4

INVENTOR
KARL KECK
BY Young, Emery & Thompson
ATTORNEYS

United States Patent Office 2,728,431
Patented Dec. 27, 1955

2,728,431

TORQUE TRANSMISSION WITH CLUTCH AND BRAKE

Karl Keck, Goppingen, Germany, assignor to L. Schuler A. G., Goppingen, Germany

Application February 9, 1953, Serial No. 335,630

Claims priority, application Germany February 14, 1952

8 Claims. (Cl. 192—148)

This invention relates to torque transmissions of the kind comprising a clutch and a brake operable to couple driving and driven members or shafts and to brake the driven shaft when the clutch is released. Such transmissions are used in machine tools, particularly power presses operated by an eccentric shaft.

Prior transmissions of this kind leave much to be desired as regards reliability of operation and accessibility of parts for inspection, adjustment, and repair, and it is an object of the invention to improve such transmissions in these and other respects.

Accordingly it is an object of the present invention to provide a transmission comprising rotary driving and driven members, a clutch interposed between said members, a brake, means rotating with the driving member and movable in one direction to engage the clutch and release the brake, and in the other direction to release the clutch and apply the brake, a rocking device for moving said means, and a differential band brake controlling the action of the rocking device.

The novel use of a differential band brake in this invention has the advantage that by exerting quite small control forces very powerful clutching and braking forces can be brought into play.

Figure 1:
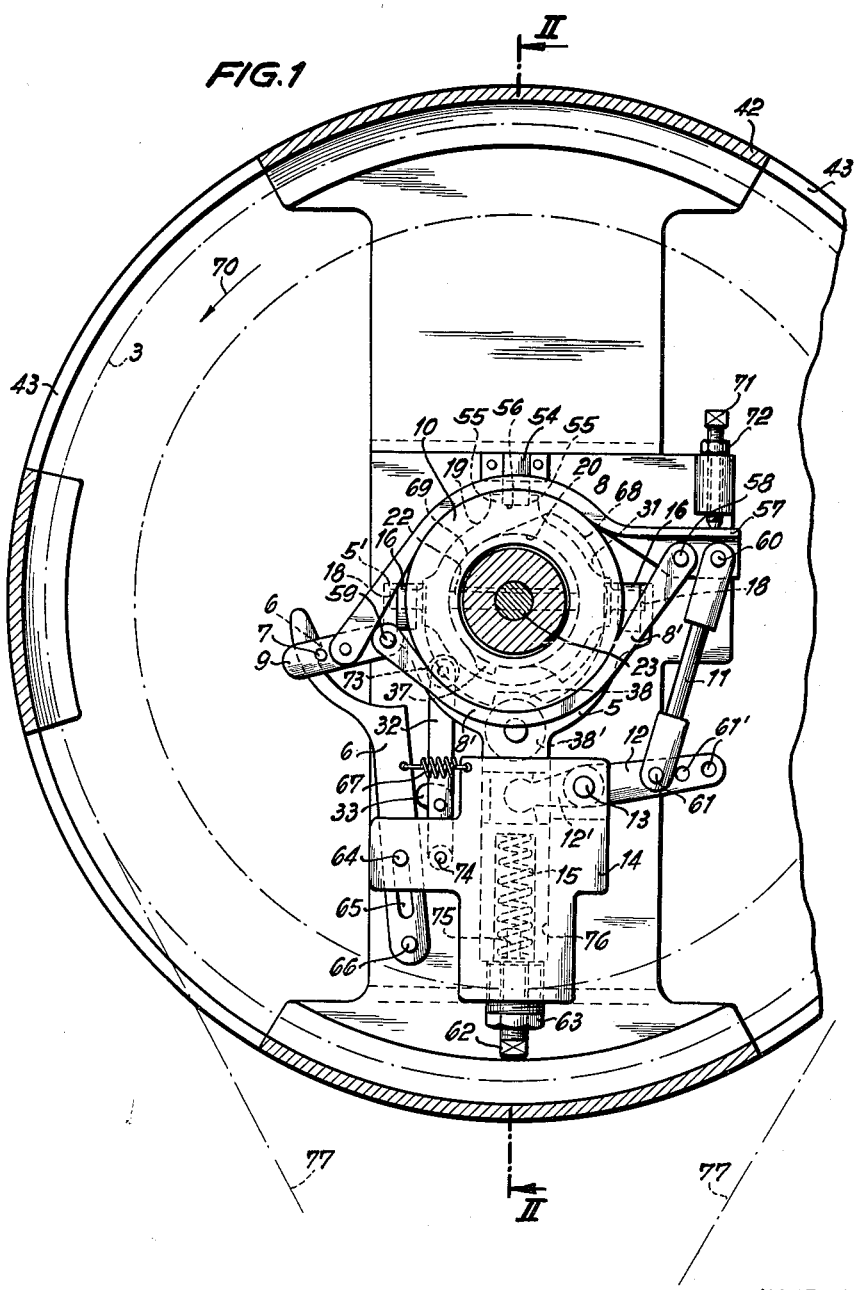
Figure 2:
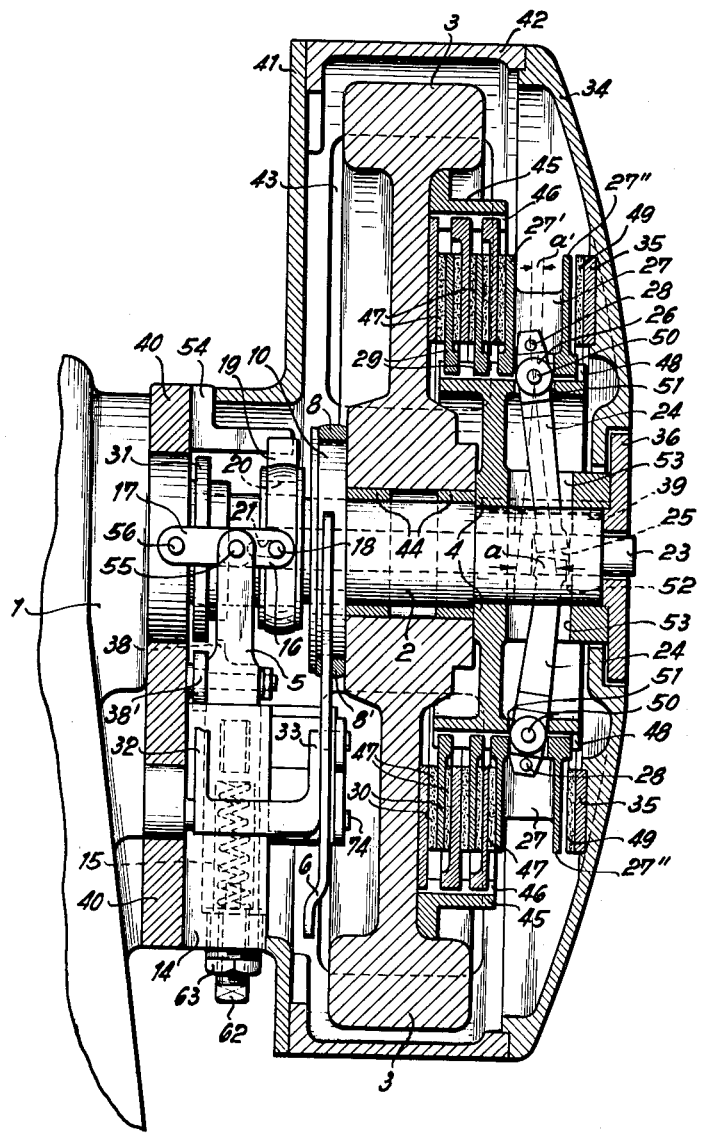
Figure 3:
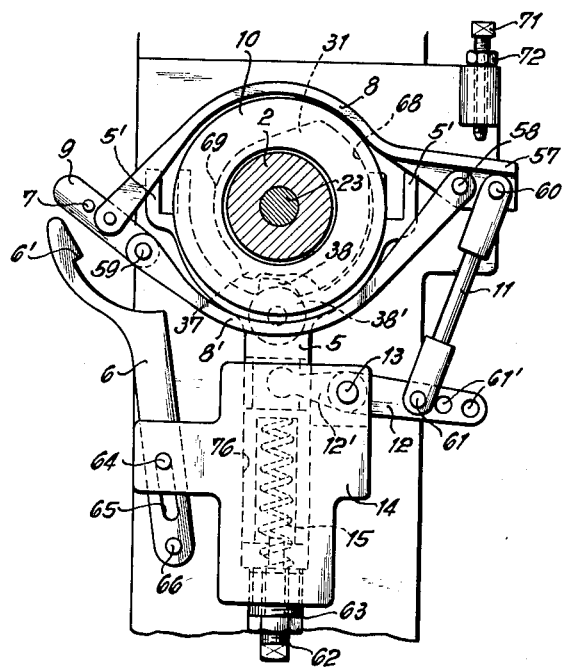
Figure 4:
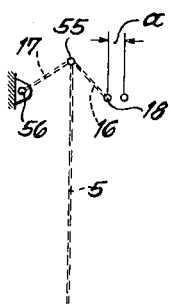
Figure 5:
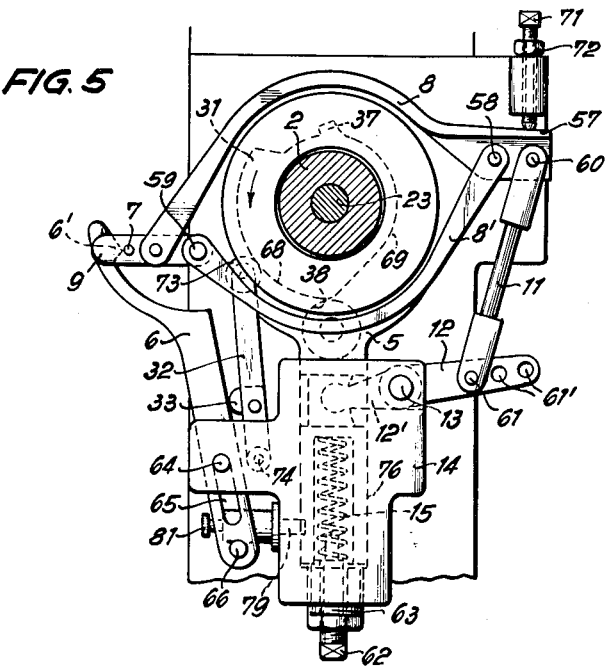
Figure 6:
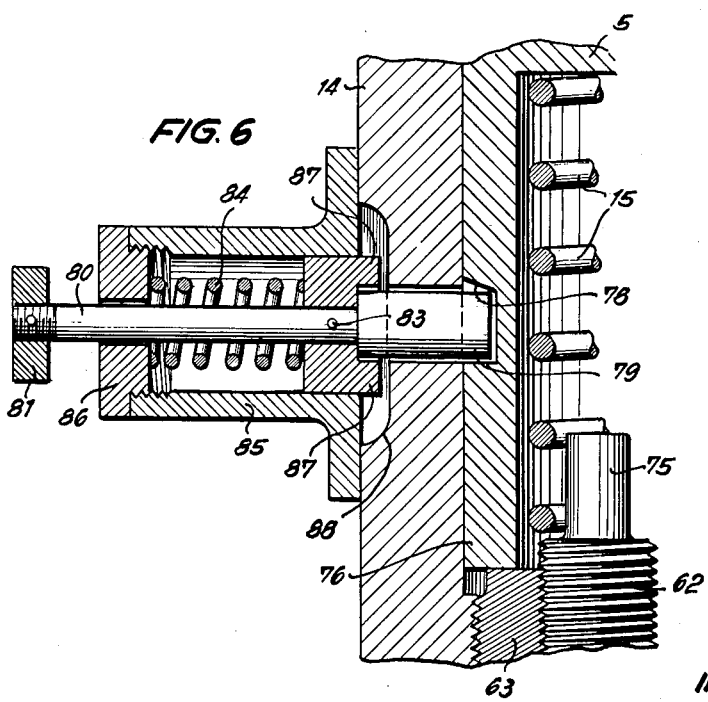

Further features and advantages of the invention will become apparent from the following description of an embodiment thereof illustrated in the accompanying drawings, in which:

Fig. 1 is an elevation, partly in section, of a transmission for use in an eccentric press, Fig. 2 is a section on line A—B of Fig. 1, Fig. 3 is a view of a detail of Fig. 1 showing parts in a different operational position, Fig. 4 is a diagrammatic and explanatory view of a detail, Fig. 5 is a view similar to Fig. 3 but shows the parts in a further operational position, and Fig. 6 is a sectional view on a large scale of an adjustment device controlling single stroke and continuous operation.

In the illustrated embodiment of the invention as applied to a power press operated by an eccentric, 1 designates the press frame in which the eccentric shaft 2 is journalled and projects therefrom. The press frame has attached thereto by flanges or in other suitable manner a housing for the clutch and brake transmission comprising a mounting plate 40, a base plate 41, a substantially cylindrical skirt 42, and a cover 43. The cover 43 has openings for observation of the operation of the mechanism, and for passage of a drive belt 77. The cover 34, as hereinafter described, carries the stationary brake disc. When the cover is removed, the hereinafter described parts of the mechanism are freely accessible. On the eccentric shaft is freely rotatable a flywheel 3 with interposition of a bushing 44, which flywheel may be considered as the driving element of the transmission, and carries a toothed ring. The flywheel may be belt driven from a suitable power source in continuous manner and has fast thereon the base ring 45 of a multi-plate clutch, so that the flywheel itself operates as a member of the multi-plate clutch. The ring 45 is toothed on its inner circumference 46. Clutch plates 30 extend between the teeth 46 and are provided with friction linings 47 as shown in Fig. 2. The eccentric shaft 2 is keyed at 39 to the clutch hub 4 which also has teeth 48 at its outer circumference, which teeth engage clutch plates 29 so that they rotate with said hub but can move axially relatively thereto. Similarly the clutch plates 30 are rotatably connected to the teeth 46 of the base ring 45 but can move axially relatively thereto. The plates 29 extend between the friction linings 47 of the plates 30. When the plates 29 are pressed together the eccentric shaft 2 is coupled to the driving flywheel 3 through the hub 4, plates 29, 30 and base ring 45.

The clutch holding force is exerted on the plates by a pressure ring 27 of substantially U-shape cross-section at the periphery, the sides of the U forming plates 27' and 27". The pressure ring 27 together with the clutch plates 29 are in mesh with the teeth of the clutch hub 4, therefore cannot rotate, but can slide axially, relatively to said hub. When the pressure ring 27 is shifted to the left, Fig. 2, as hereinafter described the clutch plates 29, 30 are pressed together by the plates 27' and the eccentric shaft thereby coupled to the driving flywheel. When the pressure ring 27 is shifted to the right, Fig. 2, the eccentric shaft 2 is braked by means of the plates 27". The plates 27" are then pressed against the brake ring 35 furnished with a brake lining 49, which brake ring is attached, for example by screws, to the stationary cover 34.

The actuation of the pressure ring 27 for either engagement or release of the clutch, and also for braking the eccentric shaft is done by a control rod 23, which is axially slidable in the eccentric shaft, made hollow for this purpose, and rotates therewith. The control rod has a transverse slot 25 engaged by suitable rounded ends of levers 24 which are pivotally mounted on pins 28 in the pressure ring 27 and carry rollers 26 on pins 50 which rollers bear in openings 51 in the hub 4 which is axially immovable. On shifting the control rod 23 to the left, Fig. 2, the levers 24 are rocked to urge the pressure ring 27 to the right to braking position, while in the position shown in Fig. 2, they hold said ring to the left, in the clutch engaging position. The levers 24 extend freely through a transverse slot 52 in the eccentric shaft and similar slots 53 in the hub 4. In engaged condition, that is when the eccentric shaft 2 rotates together with the flywheel 3, the clutch hub 4 and the pressure ring 27 with all the parts supported thereby and engaged therewith, also rotate. The axial pressure exerted during braking by the pressure ring 27 on the cover 34 is taken up by a control cover 36 fixed on the eccentric shaft 2 which is jornalled to sustain axial pressure.

There will now be described the means for axially shifting the control rod 23. A cross-pin 22 traverses the control rod 23 and projects radially on both sides through slots 21 in the eccentric shaft. The bearing of the cross-pin 22 in the slots 21 thus rotatably connects the control rod 23 with the eccentric shaft 2 while the said rod can move axially therein to the extent allowed by the free length of the slots 21. In one end position of the rod the cross-pin 22 bears on one end, and at the other end position on the other end, of the slots 21. Both ends of the cross-pin 22 extend radially beyond the slots 21 of the eccentric shaft and engage a ring 20 connected for rotation with the eccentric shaft but axially slidable thereon, but said ends do not project from the surface of the ring 20. Axial movement of the ring 20 thus produces a corresponding axial shift of the control rod 23, and the ring 20 rotates with the shaft 2 when the clutch is engaged by the appropriate axial shift of the rod 23. To slide the ring 20 axially, it is secured in a ring 19 surrounding it and also slidable in the axial rotation but not rotatable. The ring 19 is held by an arm 54 fixedly secured to the mounting plate 40, which arm engages between two projections 55 on the ring 19 (Fig. 1). The ring 19 has radial trunnions 18 preferably concentric with a diameter of the ring and fixed therein as by screwing or integral therewith. Each trunnion has pivoted thereon a link 16, jointed to another link 17 and the other ends of the links 17 are pivoted on fixed pins 56, preferably secured in the mounting plate 40. The two link pairs 16, 17 constitute a pair of toggle joints engaging the trunnions 18 of the ring 19, the joint centres of which are at 55. These toggles can be brought into stretched position as shown in Fig. 2, or in buckled position as shown diagrammatically in Fig. 4. In the stretched position, Fig. 2, the ring 19 and with it the control rod 23 are brought into the position for clutch engagement by means of the levers 24 and the pressure ring 27 whereas in the buckled position of the toggles, Fig. 4, the pressure ring 27 contacts the brake ring 35. The buckling and stretching of the toggles composed of the link pairs 16, 17 is effected by a fork 5 the ends 5' of which are again bifurcated and traversed by the joint pins 55'. When the fork 5 in Figs. 1 and 2 is moved upwards the links 16, 17 are buckled at 55' and the fork limbs raised to the position of Fig. 3 corresponding to the braking position of the control rod 23. When the fork 5 is moved downwards out of the position shown in Fig. 3, the toggle links 16, 17 are stretched as shown in Fig. 2, corresponding to the clutch engaging position of the control rod 23.

The downward movement of the fork 5 is derived from the rotation of the driving flywheel 3 through a differential band brake. A continuously rotating ring 10 is fastened to the flywheel 3 which ring 10 is surrounded by an upper brake band or shoe 8 and a lower brake band or shoe 8' of the differential band brake. The lower shoe 8' is jointed at 58 to a contact arm 57 extending from the upper brake shoe 8. The other ends of the brake shoes are jointed to a lever 9 which actuates them, at a relatively short distance apart, the upper brake shoe by means of a pin 7' extended over the joint and the lower brake shoe at 59. To the contact arm 57 there is jointed at 60 a connecting rod 11 of adjustable length which is connected at 61 to an arm of a lever 12, 12' pivoted at a fixed axis 13. The lever arm 12 has a number of holes 61' at different distances from the axis 13 enabling the forked lower end of the rod 11 to be connected to the lever arm 12 at places other than 61 thus rendering adjustable the effective length of the lever arm 12. The pivots 13 of the lever 12, 12' are located in a part 14 of the clutch enclosure which serves as housing for a spring 15, in which housing also the shank 76 of the fork 5 is guided and has its lower part formed as a sleeve to receive this spring. The lever arm 12' is attached to the shank 76 of the fork 5, preferably by a ball joint as shown in the drawing, but alternatively the arm 12' may be forked and have the fork ends bifurcated and engaging spring pressed pins on the shank 76. The upper end of the spring 15 bears against the bottom of a sleeve bore in the shaft 76 of the fork 5, its lower end bears on an adjusting screw 62 which is extended to form a guide pin 75, and which is screwed through the housing 14.

The adjusting screw 62 is threaded through a nut 63 having an external screw thread by which it is screwed into the housing 14, the upper end of this nut forming a stop limiting the downward travel of the fork 5, the lower end of its shank 76 bearing on the end of the nut when in its lowermost position. The deepest position of the fork 5 and therefore the stretched position of the links 16, 17 thus can be adjusted by means of the nut 63 while the pretension of the spring 15 can be regulated by the screw 62.

The housing 14 has a pivot pin 64 fixed therein and engaging a slot 65 in the leg of a pawl 6 so that the pawl can turn and slide on said pivot pin. The pawl leg is connected at its lower end 66 to an actuating rod, not shown. The upper end of the pawl 6 carries a hook 6' co-operating with the pin 7 of the lever 9. Between the pawl 6 and the housing 14 is suspended a tension spring 67 which urges the pawl into the position shown in Fig. 1.

The eccentric shaft 2 has fast thereon a profile cam 31 having a part 68 of larger diameter and a part 69 of smaller diameter. The cam periphery also has a projection 37 capable of co-operating with a hump 38 on the fork 5. The fork also carries a roller 38' co-operating with the part 68 of the profile cam.

The operation is as follows:

When the clutch is released and the eccentric shaft at rest, the parts are in the position shown in Figs. 3 and 4, while the control rod 23 is shifted to the left, out of the position shown in Fig. 2. The force of the tensioned spring 15 then presses the fork 5 upward, thus holds the toggle links 16, 17 buckled, and applies braking force by means of which the control rod 23 urges the pressure ring 27 against the brake ring 35. As the fork 5 is pressed upwardly the hump 38 thereon engages the gap formed in front of the projection 37 on the periphery of the cam 31. The front of the projection 37 bears on the front of the hump 38. In this position of the parts the press ram is at its upper dead point.

To engage the clutch the pawl 6 is first moved upwardly by the actuating means at 66, for example a released spring force, until the hook 6' arrives over the pin 7, whereupon the spring 67 holds the pawl in position engaging said pin. Then by further operation of the actuating means the pawl 6 is drawn downwards carrying the pin 7 with it. If the flywheel 3 and attached ring 10 rotate in the direction of arrow 70, the ring 10, as soon as the upper brake shoe 8 bears on it owing to the downward travel of the pawl 6, urges the said brake shoe to take part in its rotation. This tendency however encounters resistance from the rod 11 so that at first the lever 9 is rocked counterclockwise about the pin 59 from the position of Fig. 3 into the position of Fig. 1, the shoes 8, 8' of the differential brake being drawn together and applied against the circumference of the ring 10. The resulting frictional force is sufficient to cause rotation of both brake shoes, further tensioning the spring 15 through the lever 12, 12' until the contact arm 57 of the upper brake shoe 8 encounters a stop formed by an adjusting screw 71 and lock nut 72. The rocking of the lever 12, 12' causes the fork 5 to move downwards, and the hump 38 moves out of the path of the projection 37. At the same time the toggle links 16, 17 are stretched by the fork 5 so that the links 16 move the ring 19 axially, in which movement it carries the attached ring 20 along. The ring 20, by means of the cross-pin 22, shifts the control rod 23 into the position shown in Fig. 2 in which the plate coupling is engaged by the lever 24. The eccentric shaft now rotates.

The force with which the differential hand brake is applied diminishes from the moment that the lever 32, under the action of the cam part 68, brings the hook 6' out of engagement (Fig. 5). From this instant the cam part 68 co-operates with the roller 38', the friction lining 47 of the plate coupling nevertheless remain effective, that is, the clutch remains engaged because the toggle 16, 17 is stretched. As long as the cam part 68 contacts the roller 38' the differential brake is opened, its opening being initiated by the frictional action exerted by the lower brake shoe 8' while the contact arm 57 remains in contact with the projection 71. The differential band brake therefore is applied with full frictional engagement as is necessary for the further tensioning of the spring 15. As soon as the actuating force at 66 ceases, the brake shoes 8, 8' open, so that the force of the spring 15 again moves the fork 5 upwards into the position of Fig. 4 in which the parts 23—49 are in braking position as above described. By thus forcing the fork 5 upwardly the toggle links 16, 17 are again buckled and by means of the control rod 23 and the pressure ring the eccentric shaft is braked to stand still relative to the brake ring 35.

Since it is necessary in a power press to protect the operator against unintentional restarting, cessation of the actuating force at 66 during the downward travel of the ram always prevents action of the lever 9 on the brake shoes 8, 8', so that the spring 15 forces the fork 5 upwards into the position shown in Fig. 4, and the machine, without disengaging the pawl 6, stops.

Since a differential brake with relatively small friction forces brings into action powerful forces for the compression of the spring 15, a spring can be used capable of delivering such strong braking effort that the eccentric shaft is instantly arrested as soon as the action of the spring 15 is released. The part 69 of the profile cam 31 passing the hump, corresponds to the downward travel of the press ram so that the machine during this downward stroke always comes to a stop as soon as the actuating force at 66 ceases to operate. During the rise of the ram it is not desired to stop the machine. When the pawl 6 is disengaged during the rising stroke of the ram, the fork 5 cannot be moved upwards by the spring because the roller 38' on the fork 5 is now riding on the larger diameter part 68 of the profile cam 31.

After a half rotation of the eccentric shaft 2 a projection on the profile cam 31 encounters a roller 73 on the lever 32 pivoted at 74 on the spring housing 14 and rocks this lever. An arm 33 is connected to this lever and actuates the pawl 6 to raise it. In the upward travel of the fork 5 the hump 38 arrives in front of the projection 37, if the shaft 2 has not already been arrested by the brake 27", 49, for example on cessation of the engaging effort acting at 66 in releasing the engaging device during the ram down-stroke. The ram is thereby held fast in its upper dead center position after the rotating masses connected to the shaft 2 have been braked by the brake devices 27", 49.

In the last described operation the press performs only one stroke. The clutch can be modified however to allow continuous operation.

In the example of Figure 6, as long as continuous operation is desired, the fork 5 is retained by means of a bolt 79 engaging a notch 78 in its shank 76, which bolt has a shaft 80 terminating in a knob 81. A ring 82 is attached to the shaft 80, by means of a pin 83, which ring is acted on by a spring 84 which urges the bolt 79 into locking position. The spring is arranged in a casing 85 flange connected to the housing 14, in which casing 85 the ring 82 is guided. The spring 84 is arranged between the ring 82 and a cover 86 of the casing 85, through which cover the shaft 80 extends. The ring 82 has projections 87 which, when the bolt engages the notch 78, engage a recess 88 formed in the housing 14. When the projections 87 are withdrawn from the recess 88 by operating the knob 81, and the knob turned through 90° and then released, the bolt 79 will no longer engage the notch 78 and the shank 76 of the fork 5 can return upwardly under the action of the spring 15, so that automatic stopping after each single stroke again comes into effect.

I claim:

1. A torque transmission comprising a shaft, a driving member, a clutch for operatively connecting and disconnecting said shaft and said driving member, actuating means for engaging and disengaging said clutch, a brake operative upon said shaft when said clutch is in a disengaged position, means for applying and releasing said brake and associated with said actuating means so as to apply said brake when said clutch is disengaged, and to release said brake when said clutch is engaged, means for deriving a supply of energy from said driving member for operating said clutch and brake, said last-mentioned means comprising a differential band brake and an element driven by and rotating with said driving member, said differential brake adapted to be applied to said element and being rotatable therewith, means for restricting the angular movement of said differential brake, and intermediate members differing from said element connected to said differential brake and adapted to convert the angular movement of said differential brake into a reciprocating movement of said clutch actuating means for operating the same.

2. A torque transmission comprising a shaft, a driving member, a clutch for operatively connecting and disconnecting said shaft and said driving member, actuating means for engaging and disengaging said clutch, a brake operative upon said shaft when said clutch is in a disengaged position, means for applying and releasing said brake and associated with said actuating means so as to apply said brake when said clutch is disengaged, and to release said brake when said clutch is engaged, means for deriving a supply of energy from said driving member for operating said clutch and brake, said last-mentioned means comprising a differential band brake and an element driven by and rotating with said driving member, said differential brake adapted to be applied to said element and being rotatable therewith, means for restricting the angular movement of said differential brake, intermediate elements connected to said differential brake and adapted to convert the angular movement of said differential brake into a reciprocating movement of said clutch actuating means for operating the same, and means jointed to and actuated by the differential band brake and comprising a reciprocating fork having a shank, a spring engaging the shank and forming a power storage means, said means for applying and releasing said brake including a control rod and toggle joints by means of which the control rod is connected to the fork.

3. A torque transmission comprising a shaft, a driving member, a clutch for operatively connecting and disconnecting said shaft and said driving member, actuating means for engaging and disengaging said clutch, a brake operative upon said shaft when said clutch is in a disengaged position, means for applying and releasing said brake and associated with said actuating means so as to apply said brake when said clutch is disengaged, and to release said brake when said clutch is engaged, means for deriving a supply of energy from said driving member for operating said clutch and brake, said last-mentioned means comprising a differential band brake and an element driven by and rotating with said driving member, said differential brake adapted to be applied to said element and being rotatable therewith, means for restricting the angular movement of said differential brake, intermediate elements connected to said differential brake and adapted to convert the angular movement of said differential brake into a reciprocating movement of said clutch actuating means for operating the same, and means jointed to and actuated by the differential band brake and comprising a reciprocating fork having a shank, a spring engaging the shank and forming a power storage means, said means for applying and releasing said brake including a control rod and toggle joints by means of which the control rod is connected to the fork, the shaft being hollow through which the control rod extends, and said actuating means and brake applying and releasing means including a pressure ring rotatable with and axially slidable with respect to the shaft, said pressure ring serving to engage and release the clutch and to release and apply the brake.

4. A torque transmission comprising a shaft, a driving member, a clutch for operatively connecting and disconnecting said shaft and said driving member, actuating means for engaging and disengaging said clutch, a brake operative upon said shaft when said clutch is in a disengaged position, means for applying and releasing said brake and associated with said actuating means so as to apply said brake when said clutch is disengaged, and to release said brake when said clutch is engaged, means for deriving a supply of energy from said driving member for operating said clutch and brake, said last-mentioned means comprising a differential band brake and an element driven by and rotating with said driving member, said differential brake adapted to be applied to said element and being rotatable therewith, means for restricting the angular movement of said differential brake, intermediate elements connected to said differential brake and adapted to convert the angular movement of said differential brake into a reciprocating movement of said clutch actuating means for operating the same, means jointed to and actuated by the differential band brake and comprising a reciprocating fork having a shank, a spring engaging the shank and forming a power storage means, said means for applying and releasing said brake including a control rod and toggle joints by means of which the control rod is connected to the fork, the shaft being hollow through which the control rod extends, and said actuating means and brake applying and releasing means including a pressure ring rotatable with and axially slidable with respect to the shaft, said pressure ring serving to engage and release the clutch and to release and apply the brake, and said clutch having a plurality of groups of plates of which one group of plates is axially movable with the shaft and which also guides the axial movement of the pressure ring.

5. A torque transmission comprising a shaft, a driving member, a clutch for operatively connecting and disconnecting said shaft and said driving member, actuating means for engaging and disengaging said clutch, a brake operative upon said shaft when said clutch is in a disengaged position, means for applying and releasing said brake and associated with said actuating means so as to apply said brake when said clutch is disengaged, and to release said brake when said clutch is engaged, means for deriving a supply of energy from said driving member for operating said clutch and brake, said last-mentioned means comprising a differential band brake and an element driven by and rotating with said driving member, said differential brake adapted to be applied to said element and being rotatable therewith, means for restricting the angular movement of said differential brake, intermediate elements connected to said differential brake and adapted to convert the angular movement of said differential brake into a reciprocating movement of said clutch actuating means for operating the same, means jointed to and actuated by the differential band brake and comprising a reciprocating fork having a shank, a spring engaging the shank and forming a power storage means, said means for applying and releasing said brake including a control rod and toggle joints by means of which the control rod is connected to the fork, and means including at least one adjustable leverage between the band brake and the fork.

6. A torque transmission comprising a shaft, a driving member, a clutch for operatively connecting and disconnecting said shaft and said driving member, actuating means for engaging and disengaging said clutch, a brake operative upon said shaft when said clutch is in a disengaged position, means for applying and releasing said brake and associated with said actuating means so as to apply said brake when said clutch is disengaged, and to release said brake when said clutch is engaged, means for deriving a supply of energy from said driving member for operating said clutch and brake, said last-mentioned means comprising a differential band brake and an element driven by and rotating with said driving member, said differential brake adapted to be applied to said element and being rotatable therewith, means for restricting the angular movement of said differential brake, and intermediate elements connected to said differential brake and adapted to convert the angular movement of said differential brake into a reciprocating movement of said clutch actuating means for operating the same, and stop means for fixing the end position of the shaft coupled therewith.

7. A torque transmission comprising a shaft, a driving member, a clutch for operatively connecting and disconnecting said shaft and said driving member, actuating means for engaging and disengaging said clutch, a brake operative upon said shaft when said clutch is in a disengaged position, means for applying and releasing said brake and associated with said actuating means so as to apply said brake when said clutch is disengaged, and to release said brake when said clutch is engaged, means for deriving a supply of energy from said driving member for operating said clutch and brake, said last-mentioned means comprising a differential band brake and an element driven by and rotating with said driving member, said differential brake adapted to be applied to said element and being rotatable therewith, means for restricting the angular movement of said differential brake, intermediate elements connected to said differential brake and adapted to convert the angular movement of said differential brake into a reciprocating movement of said clutch actuating means for operating the same, means jointed to and actuated by the differential band brake and comprising a reciprocating fork having a shank, a spring engaging the shank and forming a power storage means, said means for applying and releasing said brake including a control rod and toggle joints by means of which the control rod is connected to the fork, a cam on the shaft, and stop means for fixing the end position of the shaft with the driving member, said stop means cooperating with the cam and the fork.

8. A torque transmission comprising a shaft, a driving member, a clutch for operatively connecting and disconnecting said shaft and said driving member, actuating means for engaging and disengaging said clutch, a brake operative upon said shaft when said clutch is in a disengaged position, means for applying and releasing said brake and associated with said actuating means so as to apply said brake when said clutch is disengaged, and to release said brake when said clutch is engaged, a housing for the clutch and the brake mechanism of which a cover part of the housing acts as and is part of said brake, means for deriving a supply of energy from said driving member for operating said clutch and brake, said last-mentioned means comprising a differential band brake and an element driven by and rotating with said driving member, said differential brake adapted to be applied to said element and being rotatable therewith, means for restricting the angular movement of said differential brake, and intermediate elements connected to said differential brake and adapted to convert the angular movement of said differential brake into a reciprocating movement of said clutch actuating means for operating the same, a housing for the clutch and the brake mechanism of which a cover part of the housing acts as and is part of the brake.

References Cited in the file of this patent

UNITED STATES PATENTS

| | | |
|---|---|---|
| 2,271,559 | Knowlton | Feb. 3, 1942 |
| 2,408,301 | Eason | Sept. 24, 1946 |
| 2,537,557 | Stueland | Jan. 9, 1951 |
| 2,641,343 | Bennett | June 9, 1953 |